United States Patent [19]

Thorne et al.

[11] Patent Number: 4,787,994

[45] Date of Patent: Nov. 29, 1988

[54] METHOD FOR PREPARATION OF HYDROCARBON FRACTURING FLUIDS, FLUIDS PREPARED THEREBY, AND METHODS RELATED THERETO

[75] Inventors: Michael A. Thorne, Kirkwood; Gary A. Scherubel, St. Louis, both of Mo.

[73] Assignee: Petrolite Corporation, St. Louis, Mo.

[21] Appl. No.: 179,921

[22] Filed: Apr. 11, 1988

[51] Int. Cl.$^4$ .......................................... C10M 137/04
[52] U.S. Cl. ................................. 252/32.5; 252/8.551; 252/315.1
[58] Field of Search .................. 252/8.55 R, 32.5, 316

[56] References Cited

U.S. PATENT DOCUMENTS

| | | | |
|---|---|---|---|
| 3,494,949 | 2/1970 | Monroe et al. | 252/32.5 |
| 3,505,374 | 4/1970 | Monroe . | |
| 3,575,859 | 4/1971 | Monroe . | |
| 3,757,864 | 9/1973 | Crawford et al. . | |
| 4,031,014 | 6/1977 | Griffin, Jr. . | |
| 4,038,207 | 7/1977 | Poklacki et al. . | |
| 4,046,524 | 9/1977 | Van Heden | 252/32.5 |
| 4,104,173 | 8/1978 | Gay et al. . | |
| 4,152,289 | 5/1979 | Griffin, Jr. . | |
| 4,153,066 | 5/1979 | Griffin, Jr. . | |
| 4,153,649 | 7/1979 | Griffin, Jr. . | |
| 4,174,283 | 11/1979 | Griffin, Jr. . | |

FOREIGN PATENT DOCUMENTS 976335 10/1975 Canada .
0225661 12/1985 European Pat. Off. .

*Primary Examiner*—Jacqueline V. Howard
*Attorney, Agent, or Firm*—Robert E. Wexler

[57] ABSTRACT

A method for viscosifying a liquid hydrocarbon-based fracturing fluid is disclosed. The method comprises mixing together a liquid hydrocarbon, an acid, a phosphate composition and an aluminate activator. The phosphate composition comprises an organic phosphate ester selected from the group consisting of orthophosphate esters of the formulae

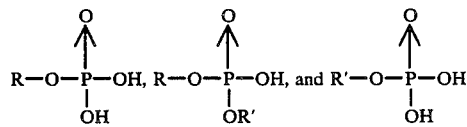

wherein R is an alkyl group containing one to about eight carbon atoms and R' is selected fromt the group consisting of alkyl groups containing about six to about eighteen carbon atoms, alkenyl groups containing about six to about eighteen carbon atoms and mixtures thereof. Hydrocarbon-based fracturing fluids prepared by such method, and methods of use of such fluids are also disclosed.

19 Claims, No Drawings

METHOD FOR PREPARATION OF HYDROCARBON FRACTURING FLUIDS, FLUIDS PREPARED THEREBY, AND METHODS RELATED THERETO

BACKGROUND OF THE INVENTION

1. Field of the Invention

The present invention relates to stimulation of underground wells by injection of hydrocarbon-based fracturing fluids, and more particularly to gellation of such fluids. 2. Description of the Prior Art In view of the scarcity and value of crude oil, crude oil producers are continually searching for methods and products for improved "well stimulation" to maximize recovery of crude oil from underground wells. One of the problems encountered in attempting to maximize oil recovery by well stimulation is oil entrapment. Oil wells often contain large amounts of crude oil entrapped in pockets in underground rock formations. Such entrapped oil does not tend to flow readily to the well bore and so from an economical standpoint, such entrapped oil generally is not recoverable under such conditions.

Thus, the art of well stimulation commonly employs a technique called "fracturing" to enhance the recovery of oil and gas from subterranean formations. Normally, fracturing involves the injection of viscosified aqueous or hydrocarbon fluids, which usually contain a proppant material, such as sand, into a well bore at such a rate and pressure as to exceed the formation stresses, thereby causing rock fatigue and inducing new fractures in the formation. Fractures are natural or induced cracks or channels in the formation matrix. After the exerted injection pressure has been relieved, fracture closure will occur and the induced cracks will be "propped" open by the proppant material. A more conductive channel is thus provided to allow the oil or gas to flow to the well bore after the injection pressure is relieved.

Viscous fluids possess several properties which are favorable to fracturing applications. For example, the fluid viscosity is proportionally related to the created fracture volume and fracture width. Higher fluid viscosities, therefore, will generate larger fracture volumes and fracture widths. Viscous fluids further serve as efficient proppant transporting media necessary to place a proppant into the opened fracture. In other words, proppants tend to settle out of low viscosity fluids before or soon after injection into a well, but to remain suspended in higher viscosity fluids. Therefore, fluids of higher viscosity more efficiently carry the proppant into fractures. Generally, it has been found that a viscosity of at least about 100 cps at 170 sec.$^{-1}$ is necessary to carry sand effectively.

The geology and geochemistry of various formations dictate the nature of the fracturing fluid, i.e., whether neutral or strongly acidic aqueous fluids or hydrocarbon fluids should be used.

Many wells are water-sensitive. For example, oil deposits are sometimes found in sandstone formations containing clay which, when exposed to water, tends to swell, thereby reducing the flow of oil. Accordingly, gelled hydrocarbons are frequently used as fracturing fluids. Hydrocarbon-based fracturing fluids typically are gelled by a phosphate/aluminum gelling system as described, for example, in U.S. Pat. Nos. 3,494,949, 3,575,859, 4,104,173 and others. According to this method, a phosphate composition, a liquid hydrocarbon such as crude oil, and an activator, particularly sodium aluminate, are mixed together. The phosphate compositions suitable for such applications are well known in the art and generally comprise an organic phosphate of the general formula

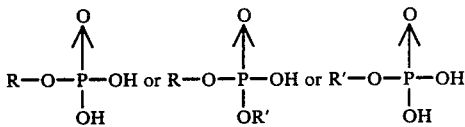

wherein R is an alkyl group containing one to about eight carbon atoms and R' is an alkyl group or an alkenyl group containing about six to about eighteen carbon atoms, or a mixture thereof. Particular species typical of such phosphates are identified in the above-noted patents. Blending and circulation of the resulting mixture are then maintained for between about 1 and about 24 hours, until the viscosity of the mixture reaches a desired level. Viscosification is understood to take place as a result of the formation of phophate/aluminum complexes as aluminum ions from the activator, generally the aluminum ions from sodium aluminate, replace the acidic hydrogens of the phosphate.

In view of the advantages related to hydrocarbon-based fracturing fluids of high viscosity, the oil production industry is continually searching for hydrocarbon-based fracturing fluids of ever higher viscosities, and for efficient, low cost methods for producing such higher viscosities. Moreover, conventional hydrocarbon-based fracturing fluids tend to lose viscosity at higher temperatures, i.e., about 250° F. or more, often found in wells. Accordingly, hydrocarbon-based fracturing fluids which maintain high viscosity at high temperatures are needed.

Another problem commonly encountered is that a period of from about 1 to about 24 hours after thorough mixing of gelling agents is required for complete or maximum gellation of the hydrocarbon-based fracturing fluid. Thus, the gelling agents must be added long before the fluid is to be injected into the well, thereby constraining or interfering with preparation or application procedures; and expensive labor hours can be wasted.

Therefore a quick, simple and low cost method for increasing the viscosity of hydrocarbon-based fracturing fluids and a hydrocarbon-based fracturing fluid which maintains its viscosity at high well temperatures are desired.

SUMMARY OF THE INVENTION

Briefly, therefore, the present invention is directed to a novel method for viscosifying a liquid hydrocarbon-based fracturing fluid. According to the method, a liquid hydrocarbon, an acid, a phosphate composition and an aluminate activator are mixed together. The phosphate composition comprises an organic phosphate ester selected from the group consisting of orthophosphate esters of the formulae

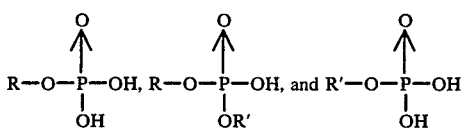

wherein R is an alkyl group containing one to about eight carbon atoms and R' is selected from the group consisting of alkyl groups containing about six to about eighteen carbon atoms, alkenyl groups containing about six to about eighteen carbon atoms and mixtures thereof.

The present invention also is directed to a novel hydrocarbon-based fracturing fluid. At 300° F. and a shear rate of 170 sec.$^{-1}$, the fluid has a viscosity of at least about 100 cps and comprises a liquid hydrocarbon, an orthophosphate ester/aluminum complex and a salt selected from the group consisting of alkali metal sulfates, alkali metal nitrates and the reaction product between an alkali metal cation and an organic sulfonic acid having at most about 10 carbon atoms.

The present invention also is directed to a novel method for fracturing underground wells comprising adding to an underground well a hydrocarbon-based fracturing fluid having a viscosity at 300° F. and a shear rate of 170 sec.$^{-1}$ of at least about 100 cps and comprising a liquid hydrocarbon, an orthophosphate ester/aluminum complex and a salt selected from the group consisting of alkali metal sulfates, alkali metal nitrates and the reaction product between and alkali metal cation and an organic sulfonic acid having at most about 10 carbon atoms.

Among the several advantages found to be achieved by the present invention, therefore, may be noted the provision of a simple, low cost method for increasing the viscosity of a hydrocarbon-based fracturing fluid; the provision of such method in which gellation takes place relatively quickly; the provision of such method which produces a hydrocarbon-based fracturing fluid which maintains a relatively high viscosity at high well temperatures; and the provision of a hydrocarbon-based fracturing fluid which maintains a high viscosity at high well temperatures.

DESCRIPTION OF THE PREFERRED EMBODIMENTS

In accordance with the present invention, it has been discovered that employment of an acid, particularly sulfuric acid, a low molecular weight organic sulfonic acid or nitric acid, especially sulfuric acid, in the preparation of a hydrocarbon-based fracturing fluid having a phosphate/aluminum gelling system, surprisingly increases the rate of gellation dramatically and produces a hydrocarbon-based fracturing fluid that has a viscosity far greater than it would have had if the acid had not been incorporated into the fluid's preparation process. Moreover, it has been found that the hydrocarbon-based fracturing fluid produced by the method of this invention maintains a high viscosity at high temperatures.

More specifically, it has been discovered that during the preparation of a hydrocarbon-based fracturing fluid having a phosphate/aluminum gelling system wherein gellation is achieved by mixture of an orthophosphate ester with an aluminate activator, simply mixing an acid such as sulfuric acid, a low molecular weight organic sulfonic acid or nitric acid, but especially sulfuric acid, with the orthophosphate ester before addition of the aluminate activator produces the above-noted superior results. This is particularly surprising in view of the fact that other acids, such as hydrochloric acid, phosphoric acid and acetic acid, have been found to yield results which, although in some circumstances are superior to those of conventional processes, are significantly poorer than those produced by use of sulfuric acid. Moreover, nitric acid and low molecular weight organic sulfonic acids, although markedly superior to hydrochloric acid, phosphoric acid and acetic acid, are also inferior to sulfuric acid, especially for preparation of fracturing fluids to be used at high temperatures.

While not being bound to any particular theory, it is believed that where the acid is, for example, sulfuric acid and the aluminate activator is, for example, sodium aluminate, sulfuric acid tends to react with the sodium ions of the sodium aluminate activator, freeing aluminum ions for complexing with and cross-linking the orthophosphate esters. Therefore, the viscosity of the fracturing fluid may be increased without increasing the concentrations of the orthophosphate ester or aluminate activator.

It is also believed that upon mixing of sodium aluminate and orthophosphate ester in the conventional process, aluminum ions and sodium ions compete for the orthophosphate ester complexing sites, i.e., for replacement of the acidic hydrogens. Thus, sodium ions block some of the sites from the aluminum ions, limiting the degree of complexing between the orthophosphate ester and aluminum ions and the related degree of cross-linking between esters. However, by incorporating an acid such as sulfuric acid into the system, it is believed that the sodium ions are attracted preferentially to the acid anion as opposed to the orthophosphate ester complexing and cross-linking sites. Accordingly, more sites remain available to the aluminum ions, thereby increasing the degree of complexing and cross-linking. Thus, it is believed that sulfuric acid is superior to other acids because it is a strong acid which reacts quickly with the strongly basic cations from standard aluminate activators, sodium ions in the case of sodium aluminate.

As a result of the addition of the acid during the preparation of the fracturing fluid, it has been found that the period for gellation has been decreased significantly from the conventional 1 to 24 hour time period. In fact, it has been found that the period required for gellation if the method of the present invention is followed is less than about two minutes, usually less than about one minute when the composition is mixed at high shear in a Waring blender. Moreover, it has been found that at about 250° F., the fracturing fluid prepared by the method of this invention has a viscosity generally on the order of two to three times the viscosity of prior art fluids of corresponding orthophosphate ester and aluminate concentrations. Further, the viscosity of prior art compositions tends to be impracticably low at temperatures above about 250° to 300° F., whereas the compositions of this invention have been found to have satisfactory viscosity, that is, at least about 100 cps at a shear rate of 170 sec.$^{-1}$, even at temperatures above about 300° to 350° F.

Preferably, in the method of this invention, an acid is mixed with a phosphate composition to form a premix. As noted, sulfuric acid is an especially desirable acid, although other acids, particularly nitric acid or a low molecular weight organic sulfonic acid such as xylene sulfonic acid, may be employed. It is believed that the effectiveness of the acid relates to the strength of the acid such that it reacts quickly with the strongly basic alkali metal component of the aluminate activator. It is believed that the higher the acidity of the acid, the more effective the acid. Particularly suitable low molecular weight organic sulfonic acids are those having at most about ten carbon atoms, such as xylene sulfonic acid, methane sulfonic acid or cumene sulfonic acid. Other organic sulfonic acids such as toluene sulfonic acid may be utilitized, although the practicality of such acid may be limited in view of its relative insolubility in the composition.

The phosphate composition may comprise any of the standard orthophosphate esters generally known in the art for hydrocarbon-based fracturing fluid gellation. Phosphate compositions suitable for such applications are well known in the art and generally comprise an organic phosphate of the general formula

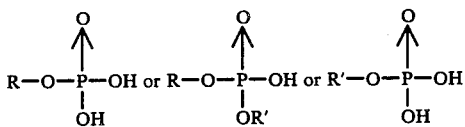

wherein R is an alkyl group containing one to about eight carbon atoms and R' is an alkyl group or an alkenyl group containing about six to about eighteen carbon atoms, or a mixture thereof. Particular species typical of such phosphates are well known to those skilled in the art and are identified in, for example, U.S. Pat. Nos. 3,494,949, 3,575,859 and 4,104,173. Hydrocarbon-based fracturing-fluid gelling systems utilizing such phosphate esters in complex with aluminum derived from an activator such as sodium aluminate are referred to herein as phosphate/aluminum gelling systems.

The orthophosphate ester composition may further comprise a solvent for ease of handling. The solvent may comprise an aromatic compound such as xylene or toluenes or a refined oil such as kerosine. If the solvent comprises a refined oil, it is preferred that the solvent further comprise an aromatic compound to improve the solubility of the orthophosphate ester salts in the system. Where a solvent is employed, the orthophosphate ester composition generally comprises at least about 70%, preferably about 80%, by weight active orthophosphate ester.

Where the acid is sulfuric acid, it is mixed with the phosphate ester composition in a proportion such as to give a sulfuric acid concentration of from about 1% by weight to about 15% by weight, preferably from about 1% by weight to about 10% by weight, typically about 5% by weight, based on total sulfuric acid/phosphate composition mixture. The amount of sulfuric acid to be added depends on the alkali metal ion content of the activator to be employed and on the mono to diester ratio of the phosphate composition.

More particularly, since molecules of alkali metal aluminates such as sodium aluminate exist in more than one formula, the ratio of alkali metal to aluminum of the aluminate activator may vary depending on the particular alkali metal aluminate composition. Therefore, the amount of acid required for neutralization depends on the relative proportion of alkali metal ions to aluminum provided by the activator composition. Thus, the higher the alkali metal to aluminum ratio of the activator, the more sulfuric acid is necessary. Simply stated, the equivalents of acid required for optimal neutralization of the alkali metal ions supplied by the activator is in about 1:1 proportion to the equivalents of alkali metal ions.

Similarly, the orthophosphate ester of the phosphate composition may be monoester as indicated by the above orthophosphate ester formulae where two hydroxy groups are attached to the phosphorous, diester as indicated by the other orthophosphate ester formula above, or a mixture of some combination of the mono and diester forms. Thus, the monoester form has two acidic hydrogens and therefore two sites per molecule for complexing with aluminum ions, while the diester has one such site. Accordingly, as is known in the art, the relative amount of aluminum to be reacted with the phosphate composition will depend upon the mono to diester ratio of the orthophosphates in the phosphate composition. Each aluminum ion, being trivalent, may replace three sites, thereby cross-linking phosphate esters.

Therefore, the optimal amount of acid to be employed depends not only on the alkali metal content of the aluminate activator, but also on the amount of aluminate activator employed, which in turn depends on the mono to diester ratio of the phosphate ester composition employed. The amount of phosphate ester composition employed is such that the concentration of phosphate ester in the resulting fracturing fluid is equivalent to that employed in conventional processes, i.e., from about 0.4% by volume to about 2% by volume, preferably from about 0.4% by volume to about 1.2% by volume.

The specific optimal relative proportions of these compositions, therefore, can be determined by the simple stoichiometric relations between the compositions. Thus, the amount of phosphate ester employed and the mono to diester ratio determine the available complexing sites, which in turn determines the amount of aluminum ions theoretically needed for complete complexing—each aluminum ion, being trivalent, can bond to three sites. Then, the alkali metal content of the aluminate in combination with the amount of aluminate to be employed determines the amount of acid for neutralization.

The premix is then mixed or blended with the liquid hydrocarbon which will make up the bulk of the fracturing fluid. Any of the standard liquid hydrocarbons useful in hydrocarbon-based fracturing fluids may be employed. Thus, crude oil or a refined oil such as diesel fuel or kerosine are appropriate.

Addition of the premix to the liquid hydrocarbon produces an unactivated fracturing fluid. The proportion of premix to hydrocarbon in the unactivated fracturing fluid is such that the orthophosphate ester concentration in the unactivated fracturing fluid is equivalent to that of the conventional processes. Thus, the unactivated fracturing fluid comprises from about 0.4% by volume to about 2% by volume, preferably from about 0.4% by volume to about 1.2% by volume, especially from about 0.6% by volume to about 1% by volume orthophosphate ester.

In an alternative method of preparation, the orthophosphate ester composition may be first mixed with the hydrocarbon which will make up the bulk of the fracturing fluid, and then the acid added to that mixture to form an unactivated fracturing fluid.

The unactivated fracturing fluid is gelled by addition of an activator. An aluminate activator, preferably sodium aluminate, is added to the unactivated fracturing fluid in an aluminate to orthophosphate ratio equivalent to that employed in the conventional process. While sodium aluminate is the activator of choice in the industry for orthophosphate gelling systems, it is contemplated that other activators for the orthophosphate system, such as other alkali metal aluminates, would be acceptable. The activated fluid is then continuously stirred until the appropriate viscosity is produced, usually not more than about 1 to 2 minutes. In a frac tank, about 0.5 to about one hour might be required to ensure complete mixing.

As noted, it is believed that the presence of the acid, particularly sulfuric acid, results in the formation of a salt when the activator is added. Thus, the advantages of this invention are believed to be achieved because the alkali metal ions of the activator have a higher affinity for the anions of the acid than they do for the acidic hydrogen sites of the orthophophate ester. Accordingly, more aluminum ions and more cross-linking sites are available, leading to a higher degree of complexing. Generally, the cation of the salt formed by this method, therefore, is the alkali metal ion from the activator and the anion is the anion from the acid, generally sulfate, nitrate or the anion from the organic sulfonic acid. Thus, where the acid is sulfuric acid and the activator is sodium aluminate, the salt is sodium sulfate.

Surprisingly, the simple alteration of the standard process of incorporating an acid, especially sulfuric acid, into the system before addition of the activator not only nearly eliminates the cumbersome 1 to 24 hour gellation time of the conventional process, but also results in a fracturing fluid of significantly higher viscosity, particularly at high temperatures, than produced by the standard process.

Thus, the hydrocarbon-based fracturing fluid produced by the method of this invention differs from hydrocarbon-based fracturing fluids produced by conventional process in several significant ways. First, the salt, preferably sodium sulfate, formed during the process remains in the final product. This salt is not found in standard hydrocarbon-based fracturing fluids. Moreover, at lower temperatures, less than about 200° F., the fluids of this invention have generally higher viscosities than prior art fluids. Further, the fluids of this invention have significant viscosities, above about 100 cps at a shear rate of 170 sec.$^{-1}$ at high temperatures, at least about 300° F., often found in underground wells. At such high temperatures, conventional fluids typically lose significant viscosity. Thus, at above about 300° F., conventional fluids generally have viscosities less than about 100 cps at a shear rate of 170 sec.$^{-1}$.

In application, by standard procedures the fracturing fluid is pumped in highly viscous gel form into an underground well under pressure for fracturing. As with prior art fluids, preferably the fracturing fluid further comprises a breaker to reduce the viscosity of the fluid after fracturing, thereby aiding in removal of the fluid. In addition, as with conventional fluids, a proppant may be mixed into the fluid before insertion of the fluid into the well.

The following example describes preferred embodiments of the invention. Other embodiments within the scope of the claims herein will be apparent to one skilled in the art from consideration of the specification or practice of the invention as disclosed herein. It is intended that the specification, together with the example, be considered exemplary only, with the scope and spirit of the invention being indicated by the claims which follow the examples. In the example all percentages are given on a volume basis unless otherwise indicated.

EXAMPLE 1

Several samples of orthophosphate ester composition in #2 diesel oil were prepared by mixing an orthophosphate ester composition with the diesel oil. The orthophosphate ester composition comprised 80% active orthophosphate ester in kerosine, and the samples comprised 1% v/v orthophosphate ester composition. To certain samples, an acid as noted in the table below was added and mixed in the amounts set forth below in the table. The concentrations of acid are based on the total acid/orthophosphate ester composition/diesel oil mixture. Next, sodium aluminate was mixed in the amounts set forth below based on total resultant mixture. The resultant mixtures were heated to various temperatures, as set forth in the table below, and the viscosity measured at 170 sec.$^{-1}$.

| Sodium Aluminate (%) | Acid | Acid (%) | Temperature (degrees F.) | Viscosity (cps) |
|---|---|---|---|---|
| 0.12 | None | 0 | 200 | 275 |
| 0.12 | None | 0 | 250 | 125 |
| 0.12 | None | 0 | 300 | 75 |
| 0.18 | Sulfuric | 0.04 | 250 | 344 |
| 0.18 | Sulfuric | 0.04 | 300 | 198 |
| 0.18 | Sulfuric | 0.04 | 350 | 150 |
| 0.15 | Sulfuric | 0.02 | 250 | 230 |
| 0.15 | Sulfuric | 0.02 | 300 | 200 |
| 0.15 | Sulfuric | 0.02 | 350 | 149 |
| 0.15 | Sulfuric | 0.02 | 400 | 58 |
| 0.15 | Nitric | 0.06 | 250 | 283 |
| 0.15 | Nitric | 0.06 | 300 | 153 |
| 0.15 | Nitric | 0.06 | 350 | 84 |
| 0.18 | Xylene Sulfonic | 0.23 | 75 | 172 |
| 0.18 | Xylene Sulfonic | 0.23 | 250 | 295 |
| 0.18 | Xylene Sulfonic | 0.23 | 300 | 147 |
| 0.18 | Xylene Sulfonic | 0.23 | 350 | 74 |
| 0.18 | Acetic | 0.09 | 75 | 44 |
| 0.18 | Acetic | 0.09 | 250 | * |
| 0.18 | Phosphoric | 0.06 | 75 | 141 |
| 0.18 | Phosphoric | 0.06 | 250 | 106 |
| 0.18 | Phosphoric | 0.06 | 300 | 42 |
| 0.18 | Hydrochloric | 0.018 | 250 | * |

*Less than 5

Thus, these data indicate that addition of sulfuric acid, or nitric acid or xylene sulfonic acid yields superior high temperature (at least about 250° F.) performance compared to the control system, and that phosphoric acid, hydrochloric acid and acetic acid additions result in inferior performance compared to the control system.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed:

1. A method for viscosifying a liquid hydrocarbon-based fracturing fluid, comprising mixing together a liquid hydrocarbon, an acid, a phosphate composition and an aluminate activator, the phosphate composition comprising an organic phosphate ester selected from the group consisting of orthophosphate esters of the formulae

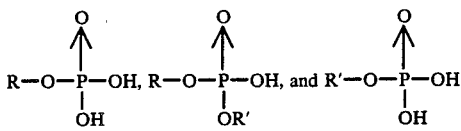

wherein R is an alkyl group containing one to about eight carbon atoms and R' is selected from the group consisting of alkyl groups containing about six to about eighteen carbon atoms, alkenyl groups containing about six to about eighteen carbon atoms and mixtures thereof.

2. A method as set forth in claim 1 wherein the acid is selected from the group consisting of sulfuric acid, organic sulfonic acids having at most about 10 carbon atoms and nitric acid and the aluminate activator is an alkali metal aluminate.

3. A method as set forth in claim 2 wherein said acid is sulfuric acid and said aluminate activator is sodium aluminate.

4. A method as set forth in claim 3 wherein the liquid hydrocarbon, acid, phosphate composition and aluminate activator are mixed by mixing the aluminate activator with an unactivated fracturing fluid prepared by mixing the liquid hydrocarbon, phosphate composition and acid.

5. A method as set forth in claim 4 wherein the liquid hydrocarbon is selected from the group consisting of crude oil and refined oils.

6. A method as set forth in claim 4 wherein the unactivated fracturing fluid is formed by mixing the phosphate composition with sulfuric acid to form a premix and then mixing the premix with the liquid hydrocarbon.

7. A method as set forth in claim 4 wherein the phosphate composition further comprises a solvent selected from the group consisting of aromatic compounds, refined oils and mixtures of refined oils and aromatic compounds.

8. A method as set forth in claim 7 wherein the solvent is kerosine and the concentration of organic phosphate ester in the phosphate composition is at least about 70% by weight.

9. A method as set forth in claim 6 wherein the amount of sulfuric acid mixed with the phosphate composition is from about 1% to about 15% by weight based on total premix.

10. A method as set forth in claim 5 wherein the liquid hydrocarbon is crude oil.

11. A method as set forth in claim 4 wherein the phosphate composition comprises a mixture of at least two organic phosphate esters selected from the group consisting of orthophosphate esters of the formulae

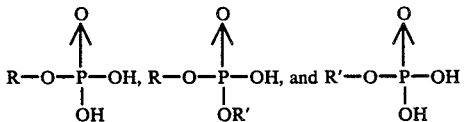

wherein R is an alkyl group containing one to about eight carbon atoms and R' is selected from the group consisting of alkyl groups containing about six to about eighteen carbon atoms, alkenyl groups containing about six to about eighteen carbon atoms and mixtures thereof.

12. A hydrocarbon-based fracturing fluid having a viscosity at 300° F. and 170 sec.$^{-1}$ of at least about 100 cps, and comprising a liquid hydrocarbon, an orthophosphate ester/aluminum complex and a salt selected from the group consisting of alkali metal sulfates, alkali metal nitrates and the reaction product of an alkali metal cation and an organic sulfonic acid having at most about 10 carbon atoms.

13. A fracturing fluid as set forth in claim 12 wherein the salt is sodium sulfate.

14. A fracturing fluid as set forth in claim 13 wherein the liquid hydrocarbon is selected from the group consisting of crude oil and refined oils.

15. A fracturing fluid as set forth in claim 13 wherein the orthophosphate ester/aluminum complex is the reaction product of sodium aluminate and an organic phosphate ester selected from the group consisting of orthophosphate esters of the formulae

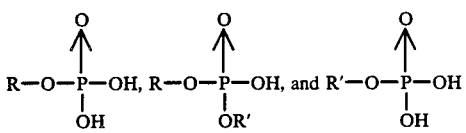

wherein R is an alkyl group containing one to about eight carbon atoms and R' is selected from the group consisting of alkyl groups containing about six to about eighteen carbon atoms, alkenyl groups containing about six to about eighteen carbon atoms and mixtures thereof.

16. A method for fracturing underground wells comprising adding to an underground well a hydrocarbon-based fracturing fluid having a viscosity at 300° F. and a shear rate of 170 sec.$^{-1}$ of at least about 100 cps and comprising a liquid hydrocarbon, an orthophosphate ester/aluminum complex and a salt selected from the group consisting of alkali metal sulfates, alkali metal nitrates and the reaction product of an alkali metal cation and an organic sulfonic acid having at most about 10 carbon atoms.

17. A method as set forth in claim 16 wherein said salt is sodium sulfate.

18. A fracturing fluid as set forth in claim 17 wherein the liquid hydrocarbon is selected from the group consisting of crude oil and refined oils.

19. A fracturing fluid as set forth in claim 17 wherein the orthophosphate ester/aluminum complex is the reaction product of sodium aluminate and an organic phosphate ester selected from the group consisting of orthophosphate esters of the formulae

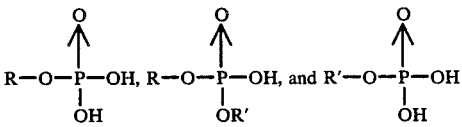

wherein R is an alkyl group containing one to about eight carbon atoms and R' is selected from the group consisting of alkyl groups containing about six to about eighteen carbon atoms and alkenyl groups containing about six to about eighteen carbon atoms.

* * * * *